United States Patent Office 3,225,529
Patented Dec. 28, 1965

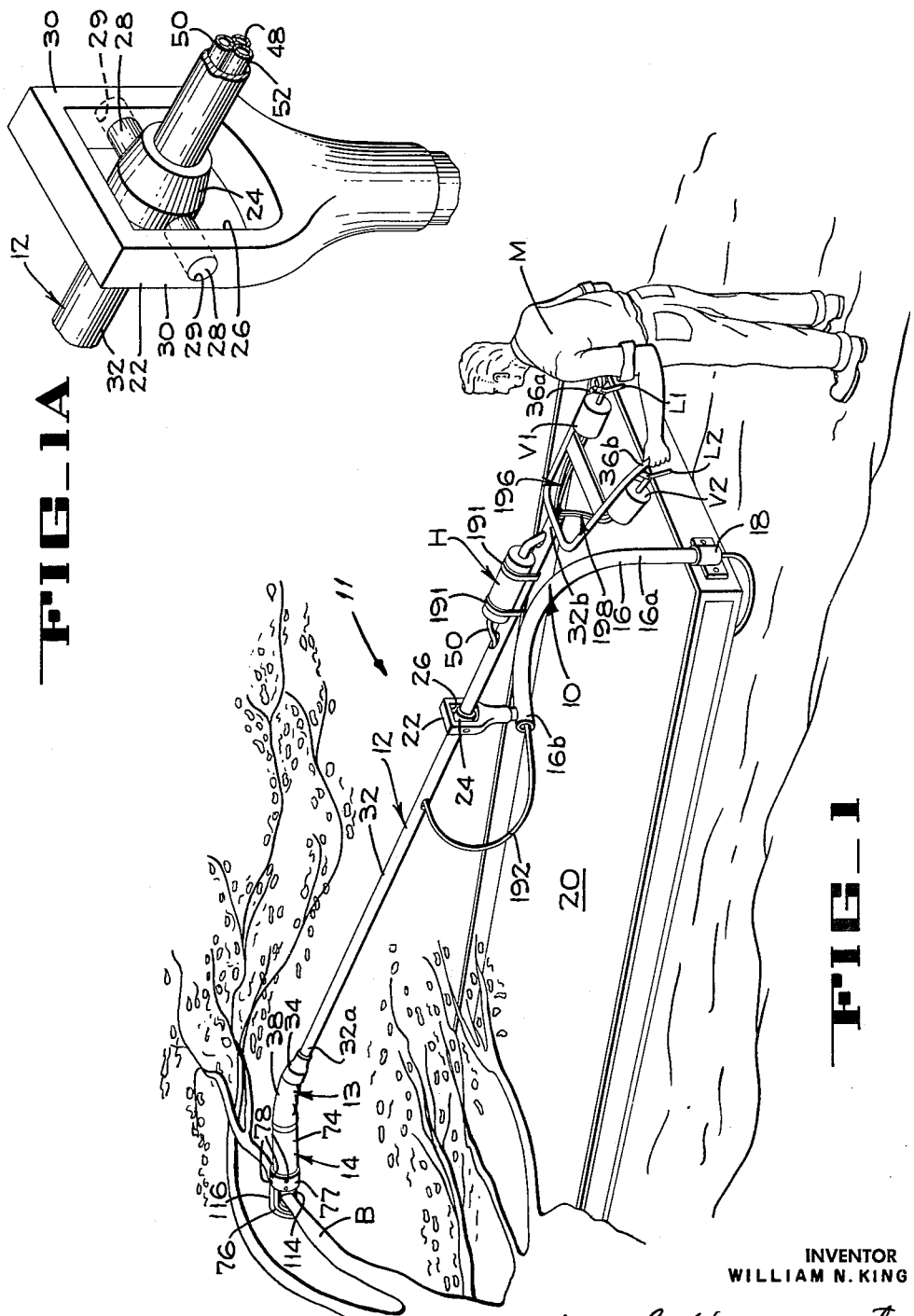

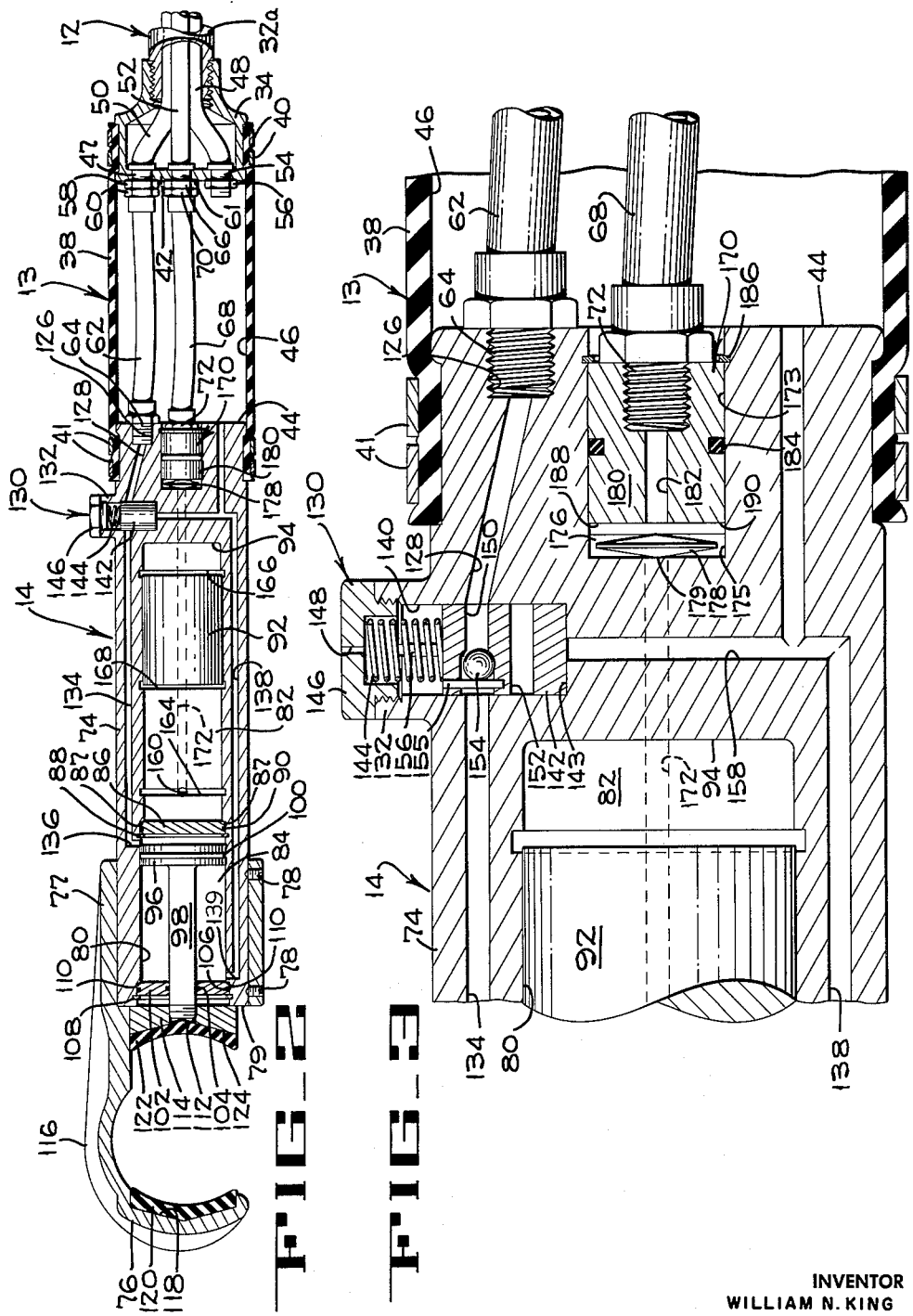

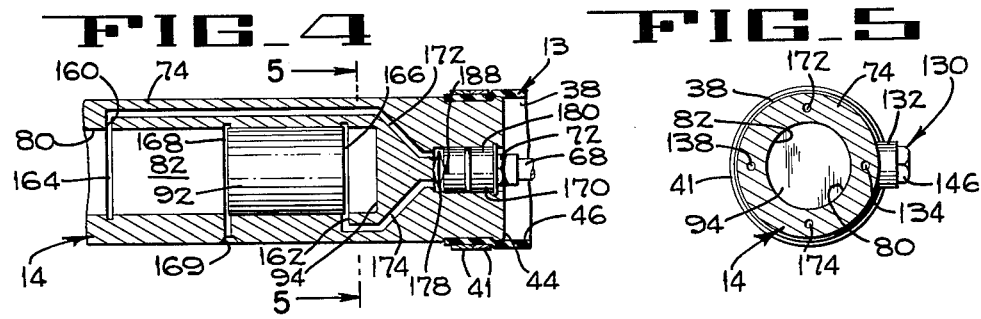
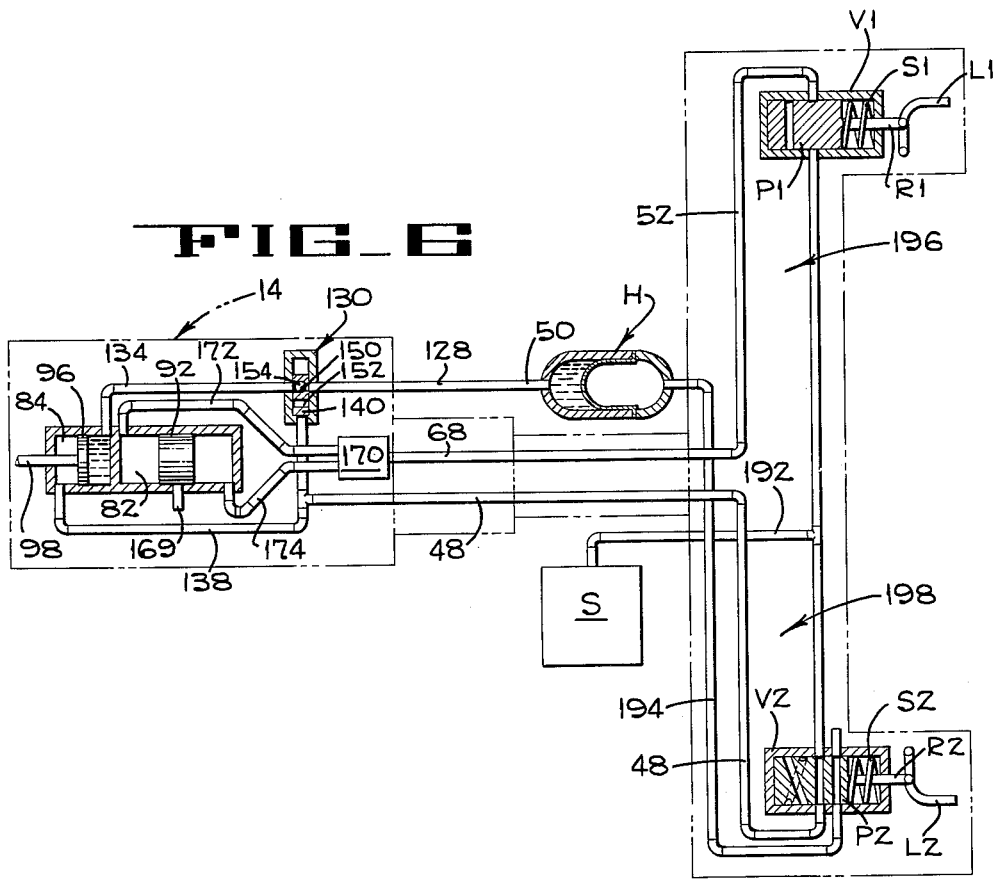

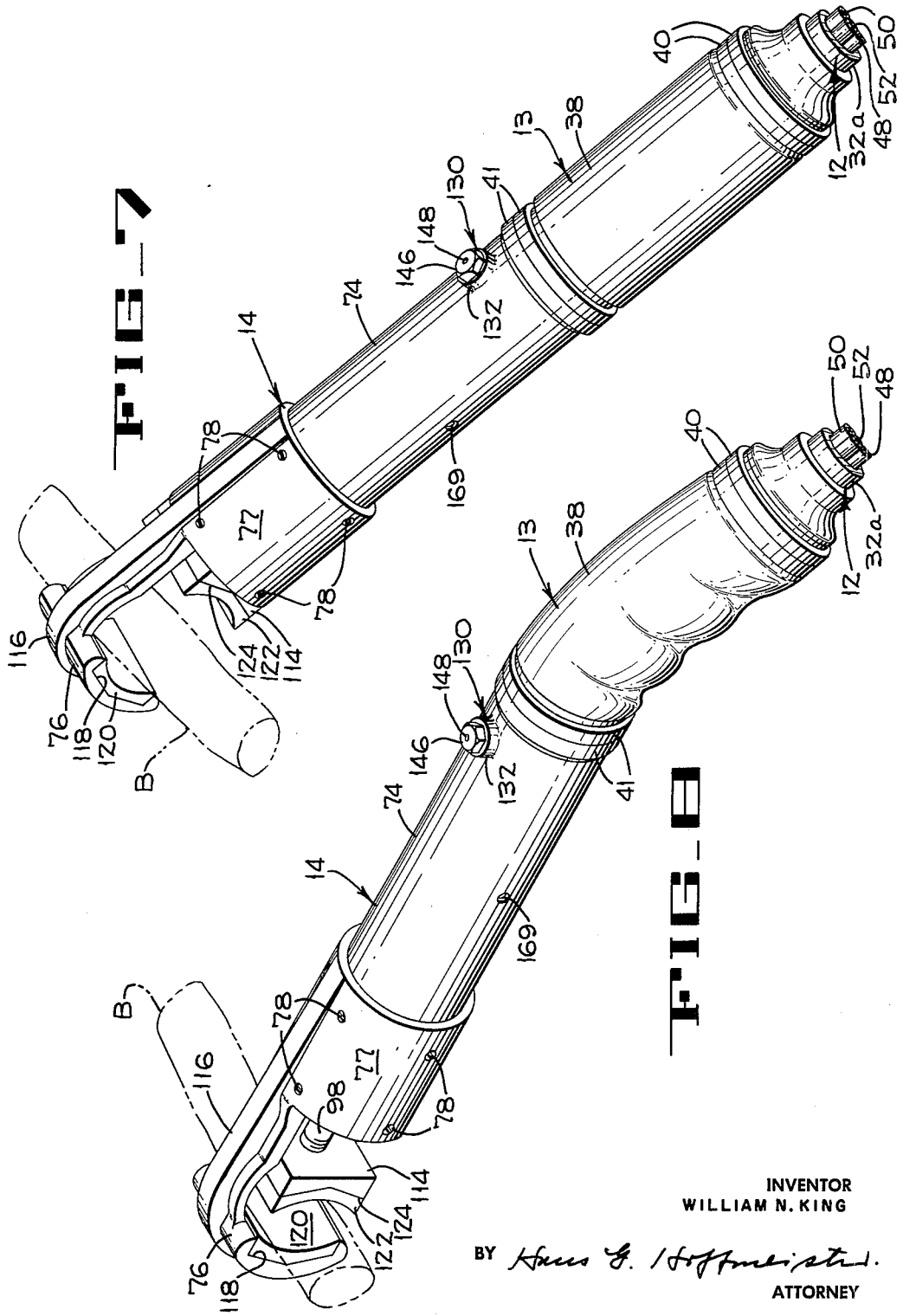

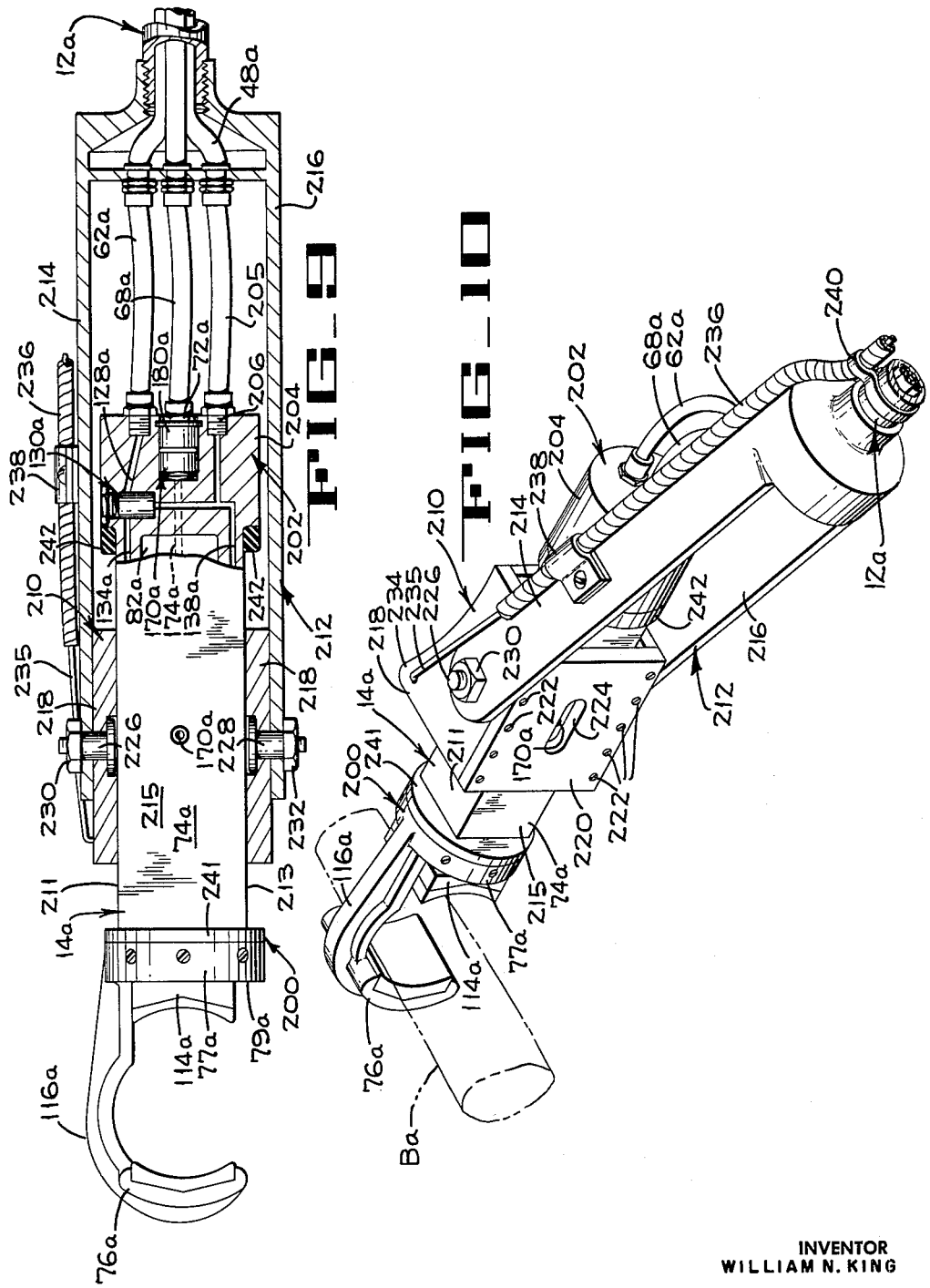

3,225,529
TREE SHAKING MECHANISM
William N. King, Los Gatos, Calif., assignor to FMC Corporation, San Jose, Calif., a corporation of Delaware
Filed Nov. 28, 1962, Ser. No. 240,490
20 Claims. (Cl. 56—328)

The present invention pertains to tree shaking mechanisms and, more particularly, to such mechanisms which are adapted to shake individual branches of a tree rather than the whole tree.

Although tree shaking mechanisms have been commonly used in conjunction with the harvesting of fruit such as nuts, many such mechanisms are complex and costly requiring a specialized tractor or motor vehicle for their transport and operation. Generally, in these mechanisms, the shaking forces are transmitted from a branch or trunk gripping device down a boom structure to the tractor so that a heavy tractor and boom are needed for effective shaking. Furthermore, in many such cases, the angle with which the shaking forces are applied to the branch or trunk is arbitrarily fixed by the relative position of the tractor and the tree so that it is very seldom possible to shake the tree efficiently. Certain known shakers, however, do not use a rigid boom which transmits the shaking forces to the tractor or the like; such shakers are suspended by cables from a boom and can only be applied to the trunk of the tree or to a limited number of vertical branches. In such case, the ease with which any branch may be gripped is greatly reduced by the fact that the shaker head can only be maneuvered by a crane gib and the supporting cables.

It is therefore an object of this invention to provide a tree shaking mechanism which does not suffer from the disadvantages associated with the above-mentioned known tree shakers.

Another object of the invention is to provide an improved shaking mechanism which does not transmit the shaking forces to the vehicle or pedestal by which it is positioned.

Another object is to provide a tree shaking mechanism which will ensure that the shaking forces are aligned perpendicularly to the trunk or limb of the tree being shaken so that the shaking forces can act most efficiently.

Another object of the present invention is to provide a tree shaking mechanism which, although generating sufficient force to effectively shake fruit from a tree, does not damage or scar the tree.

Another object of the present invention is to provide a tree shaking mechanism which is light, economical, simple in operation and construction, and which can be maneuvered easily to grip and shake any suitable branch of a fruit tree.

These and other objects and advantages of the present invention will become apparent from the following description made with reference to the accompanying drawings wherein:

FIGURE 1 is a perspective illustrating a tree shaker embodying the present invention in use.

FIGURE 1A is an enlarged detail perspective illustrating the manner in which the positioning arm of the shaker mechanism of FIGURE 1 is mounted.

FIGURE 2 is an enlarged longitudinal section of the shaker head employed by the tree shaking mechanism illustrated in FIGURE 1.

FIGURE 3 is a further enlarged longitudinal section illustrating in detail, part of the shaker head shown in FIGURE 2.

FIGURE 4 is a longitudinal section of the shaker head employed by the tree shaking mechanism of FIGURE 1, the section plane being perpendicular to the section plane of FIGURE 2.

FIGURE 5 is a cross-section of the shaker head taken along plane 5—5 of FIGURE 4.

FIGURE 6 is a schematic layout of the air and hydraulic circuits employed by the tree shaking mechanism illustrated in FIGURE 1.

FIGURE 7 is an enlarged perspective of the shaker head of the mechanism shown in FIGURE 1, the head being shown in a position to grip a limb.

FIGURE 8 is a similar view to FIGURE 7 but illustrates the position of the head after the limb has been gripped.

FIGURE 9 is an elevation, with parts broken away, of a modified shaker head also formed in accordance with this invention.

FIGURE 10 is a perspective of the modified shaker head of FIGURE 9 depicted in reduced scale.

The simplicity and ease of control of the tree shaking mechanism of this invention will be apparent from FIGURE 1 which illustrates the mechanism in actual use. The shaker mechanism consists basically of a supporting means or mounting pedestal assembly 10, and an elongated boom 11. The boom 11 includes a mounting end portion or positioning arm 12, a shaking end portion or shaker head 14, and an interconnecting means or flexible joint 13 for interconnecting the arm 12 and head 14. The positioning arm is mounted on the pedestal assembly in such a way that an operator M can easily and conveniently maneuver the shaker head to grip any branch within range.

More particularly, the pedestal assembly 10 comprises a tube 16 which lies in a generally vertical plane and is bent through approximately 90° so that one end 16a is substantially vertical and the other end 16b is substantially horizontal. The vertical end 16a of the tube 16 is rotatably mounted, by a bracket 18, to a catch frame 20, while the horizontal end 16b supports, for rotation about a vertical axis, a mounting stirrup 22 through which the positioning arm 12 extends. From FIGURE 1A it will be seen that the positioning arm 12 is mounted within the stirrup 22 by means of a sleeve 24 which is pivotally mounted in the eye 26 of the stirrup 22 by means of trunnions 28. The trunnions 28 have a common horizontal axis and are accommodated by corresponding apertures 29 formed in vertical arms 30 of the mounting stirrup.

The positioning arm 12 comprises: a length of rigid steel tubing 32 slidably and rotatably housed and supported within the mounting sleeve 24, a tubular ferrule 34 of a diameter substantially larger than that of tube 32 secured to distal end 32a of the tube whereby the flexible joint 13 is secured to the tube, and a pair of maneuvering handles 36a and 36b secured to the proximal end 32b of the tube 32. It is therefore evident that the operator M, by gripping the handles 36, may: slide the positioning arm 12 forwardly or backwardly within the sleeve 24; turn the positioning arm about the axis of its tube 32 within the sleeve 24; raise the distal or forward end 32a of the tube 32 and the connected shaker head 14 by pivoting the positioning arm about the axis of the trunnions 28; and swing the arm, stirrup 22, and pedestal tube 16 about the vertical axis of bracket 18, in addition to swinging the positioning arm and shaker head about the vertical axis of the stirrup 22. Therefore, by reasons of the above-described mounting pedestal assembly or supporting means 10, the shaker head may be positioned with ease by the operator to grip any tree branch within range of the boom 11.

Referring now to FIGURES 2, 3, 4 and 5 of the drawings, the flexible joint 13 comprises an inflatable, flexible hose 38 hermetically sealed by clamping rings 40 at its rear end to the cylindrical exterior of the ferrule 34 and by clamping rings 41 at its forward end to the cylindrical exterior of the shaker head 14. The ferrule 34 is in the form of a hollow, cylindrical cap screw threaded by its rear end into the exterior of the distal end 32a of the positioning arm tube 32, the forward end of the cap being closed by end face 42. Thus, the forward end face 42 of the ferrule 34 and rear end face 44 of the shaker head 14 combine with the tube 38 to form a closed chamber 46 which may be pressurized, by air delivered through a pressurizing hose 48, to stiffen the tube 38. The pressurizing air hose 48 is one of three hoses which passes through the position arm tube 32 and terminates at the wall 42 of the ferrule 34, the other two hoses being a hydraulic hose 50 and a vibrator air supply hose 52. The forward end of the air pressurizing hose 48 terminates in a tubular threaded fitting 54 which is passed through the end wall 42 of the ferrule 34 and is secured in place by the nut 56 which is threaded onto forward end of fitting 54. Hose 50 is likewise secured by threaded fitting 47 and nut 58 to the wall 42 but its forward end is coupled by coupling nut 60 to an extension hose 62 the forward end of which is secured by threaded connector 64 into the rear end 44 of the shaker head 41. Similarly, the vibrator supply hose 52 is secured in place in the end wall 42 of the ferrule 34 by nut 66 and threaded fitting 61 which is coupled by extension hose 68 and the coupling nut 70 to a threaded connector 72 also secured to the shaker head 14.

The shaker head 14 includes a means for clamping a portion of a tree to be shaken and also includes a means for shaking the clamping means. As shown in FIGURE 2, the shaker head basically comprises a cylindrical body 74 having the aforesaid rear end face 44 and a forwardly extending hook-like projection fixed jaw portion 76 which has an integral rear attachment ring 77 which is forced over the forward portion of the body 74 and is secured thereto by set-screws 78. The fixed jaw portion 76 is heavily reinforced by a web 116 and has a concave face 118 to which is securely bonded a rubber pad 120. The body 74 is bored axially from its forward end 79 (prior to screwing the jaw portion 76 in place) to form a blind stepped cylindrical bore 80 which defines a vibrator cylinder 82 and a clamping cylinder 84, the clamping cylinder being foremost and being divided from the vibrator cylinder by an intermediate seal disc 86. It will be noted that the diameter of the vibrator cylinder 82 is somewhat less than that of the clamping cylinder 84 so that the seal disc 86 may be positively located against a shoulder 87 formed between these cylinders, the disc 86 being held in place by spring clip 88 and forming a fluid-tight seal between the cylinders by virtue of O-ring 90 peripherally accommodated therein. A vibrator piston 92, which is part of the shaking means, is free to slide within the cylinder 82 between the sealing disc 86 and bottom end 94 of blind bore 80. (The manner in which air is supplied and exhausted from the cylinder 82 to effect the movement of piston 92 will be subsequently described.)

A disc-like clamping piston 96, which is part of the clamping means, and its forwardly extending integral piston rod 98 are housed in the clamping cylinder 84 and a seal is formed between the piston 96 and the wall of the cylinder 84 by peripherial O-ring 100 carried by the piston 96. An annular end seal disc 102 seals the forward end of cylinder 84 by means of an O-ring 104 which forms a fluid tight seal between the piston rod 98 and the disc 102 and by the outer O-ring 106 which forms a similar seal between the shaker head body 74 and the annular seal disc 102. In a manner similar to the intermediate seal disc 86, the end seal disc 102 is axially located by shoulder 110 formed in the forward end of bore 80 and by the spring clip 108. The piston rod 98 projects forwardly through the end seal disc 102 and terminates in a screw-threaded spigot 112 by which the piston rod is securely attached to a movable jaw 114.

The movable jaw is shaped with a forward concave face 124 to which is bonded a rubber pad 122. Thus, injury to a branch gripped between jaws 76 and 114 is avoided.

With particular reference to FIGURES 2 and 3, the connector 64 of extension hose 62 is screw-threaded into a hole 126 formed in the inner end face 44 of the body 74 of the shaker head 14; this hole communicates by means of passage 128 with an air operated pilot valve assembly 130 housed partially within the body 74 of the shaker head and partially within a radial boss 132 formed integrally with the body. An axially extending passage 134 connects the pilot valve assembly 130 to the rear end of the clamping cylinder 84 via cylinder port 136. A similar axially extending passage 138 connects the forward end of the clamping cylinder 84 via port 139 to the chamber 46 formed by the flexible hosing 38. Therefore, substantially the same pressure of air which exists within the chamber 46 must also exist within the forward end of the clamping cylinder 84.

The air pilot valve assembly 130 comprises a blind cylindrical bore 140 which extends radially of the body portion 74 of the shaker head 14 and is generally coaxial with the boss 132. Within the bore 140 is housed a piston valve member 142 which is biased by a helical compression spring 144 toward the bottom 143 of the bore 140, the spring 144 bearing against a cap screw 146 which closes the bore 140 except for a venting aperture 148 formed in the cap screw itself. Two transverse passageways 150 and 152 extend through the piston 142 so that either one can be aligned with passages 134 and 128 which open out into the bore 140 at diametrically opposed points. Passage 150 is arranged so that, when the pilot piston 142 is biased by the spring 144 to the bottom 143 of the bore 140, it will be opposite passages 128 and 134 (see FIG. 3); while the passage 152 is arranged so that, when the pilot piston is raised against the pressure of spring 144 and located against the lower end of cap screw 146, it will be opposite passages 128 and 134. It will be noted, however, that while passage 152 is straight and plain, passage 150 is stepped in diameter and includes a ball 154 housed within the larger portion of the passage so that it may seat against the step or shoulder formed between the two passage portions. Ball 154 is retained in passage 150 by a transverse pin 155 extending across the forward end of the passage. Thus, the ball 154 and the passage 150 act as a check valve which prevents flow of fluid from the clamping cylinder 84 to the hydraulic hose 50 when the pilot valve piston 142 is in the position shown. Piston 142 is prevented from rotating in bore 140 by a key 156 that cooperates with a keyway (not shown) in the piston 142 so that the passages 128, 134, 150 and 152 are always coplanar.

Finally, the bottom 143 of bore 140 is connected with the air passage 138 from air chamber 46 to the forward part of the clamping cylinder 84 by means of the passage 158 formed transversely of the body portion 74 of the shaker head 14. Therefore, the pilot valve piston 42 will take a position dependent upon the air pressure within the chamber 46.

Referring now in detail to FIGURES 2 and 4, air may be supplied to the vibrator cylinder 82 through a port 160 near the forward end thereof or through a port 162 near the rear end thereof, the ports respectively communicating with air distribution grooves 164 and 166 cut into the wall of the bore 80. A similar air distribution groove 168 is formed in the center of that portion of the bore 80 which constitutes the cylinder 82 and communicates via exhaust port 169 with the atmosphere. The port 160 and its associated distributing groove 164 are spaced from the sealing disc 86 and the port 162 and its associated groove 166 are similarly spaced from the cylinder end 94 so that, at each end of the cylinder 82, an air cushion may be formed to prevent the free piston 92 from striking either end of the cylinder during operation. The driving air is supplied alternately to ports 160 and 162 by means of the vibrator control valve assembly 170 housed in the rear end of the body portion 74 of the shaker head 14, the valve assembly 170 being connected with the ports 160 and 162 by the passages 172 and 174 respectively.

Since the vibrator valve assembly 170 is similar, if not identical, to valve assemblies employed for the same purpose in known pneumatic tools employing vibrators, this description will not go into great detail concerning the components and operation of this valve assembly. The valve assembly 170 basically consists of a blind bore 173 formed centrally and axially in the end face 44 of the body portion 74 of the shaker head 14, bore 173 having a forward portion 175 which defines a valve chamber 176 of cylindrical shape. As is common in such valves, the only movable part of the valve assembly 170 is a rocker disc 178 which is circular in peripheral shape and lies freely within the chamber 176. The rocker plate 178 is retained within the chamber 176 by a cylindrical plug 180 into which plug the connector 72 is screwed and through which an axial air passage 182 is formed. The plug 180 is a sliding fit within the bore 173 and a fluid tight seal is formed between the plug and the bore by O-ring 184 fitted within the outer periphery of the plug, the plug 180 being retained within the bore 170 by the spring clip 186. A transverse groove 188 is formed across the forward end 190 of the plug 180 so that the rocker disc 178 does not restrict the flow of air from the passage 182 into the chamber 176. Although, as previously explained, the valve disc 178 is circular in peripheral outline and fits within the circular chamber 176, it is of significantly smaller diameter than the chamber so that air may flow between its periphery and the chamber wall into either passage 174 or passage 172. Each face of the valve disc 178 is convex and defines a wide angle conical surface so that, in transverse section, the disc assumes the shape of a parallelogram. Thus, the disc 178 is free to rock about the point or apex 179 on its foremost surface so as to block air flow into either passage 174 or passage 172.

The operation of the vibrator and the vibrator valve assembly 170 is therefore substantially as follows: when air is admitted to the valve chamber 176, it will commence to flow in both passages 172 and 174 but, owing to different rates of flow within these passages, caused by the position of the piston 92 and various other factors, the valve disc 178 will snap into a position such that either of the passages 172 or 174 will be closed; the vibrator piston 92 will then be driven toward one end of the cylinder 82 by the air admitted through the open passage until the air at the other side of the piston is compressed sufficiently to reverse the position of the valve plate 178 so that the piston 92 is driven toward the other end of cylinder 82; just prior to the reversal of the piston, the exhaust port 169 is uncovered so that air is exhausted from behind the piston 92 and the pressure of air in the open passage drops thereby accelerating the reversal of the valve disc 178 by suddenly increasing the pressure difference in the passages 172 and 174; and such reversals of the piston 92 and disc 178 occur with greater rapidity until the reciprocation of piston 92 along cylinder 82 attains a frequency dependent primarily upon the mass of the piston and the pressure of the air supply, it being noted that the geometry of the cylinder 82 and its ports must be such that the exhaust port 169 is uncovered during each stroke of the piston to exhaust driving air from the cylinder before each return stroke of the piston 92.

The illustrated means for actuating the movable jaw 76, and for moving the arm 12 and head 14 into and out of axial alignment with each other by changing the angle between their longitudinal axes will now be described in detail.

The manner in which the shaker head 14 is supplied with the necessary power fluids through the hoses 48, 50 and 52 will now be described with particular reference to FIGURES 1 and 6. Since it is necessary that the shaker head be clamped to a branch in a substantially rigid and non-resilient manner if the branch is to be shaken effectively, the clamping piston 96 and the movable jaw 114 are moved forwardly by the admission of hydraulic liquid to the clamping cylinder 84 through passages 134 and 128 and the hydraulic extension hose 62. The hydraulic liquid is obtained from the conventional bag-type hydraulic accumulator H secured by straps 191 to the proximal, or rear, end of positioning arm 12 (see FIGURE 1) so that it also acts as a partial counterweight for the shaker head 14. As diagrammatically illustrated in FIGURE 6, the only auxiliary equipment required to operate the shaking mechanism is a source of compressed air S. The supply and exhausting of air and hydraulic liquid to the shaker head 14 is controlled by a hand operated valve V1 secured to right hand handle member 36a of handles 36 and by a similar valve V2 secured to the left hand handle member 36b (as shown in FIGURE 1).

Valve V1 is a conventional cut-off valve of the piston type and is diagrammatically illustrated in FIGURE 6 in the conventional manner; the piston P1 of this valve being operated against the pressure of an internal bias spring S1 by means of a hand lever L1 and the piston rod R1. On the other hand, valve V2 is a conventional 2-position, 4-connection valve having a ported piston P2 operated against bias spring S2 by the hand lever L2 and piston rod R2. The orientation of these valves on the handle members 36a and 36b can best be seen from FIGURE 1. As indicated in FIGURE 2, three hoses (48, 50 and 52) pass down the tubular positioning arm 12 to the handles 36 and to the hydraulic accumulator H. Therefore, the only connection between the tree shaking mechanism and the air supply S is by a single supply hose 192 which passes up the pedestal tube 16 and into the tube 32 of the positioning arm 12 (see FIGURE 1). The hydraulic hose 50 passes from the pilot valve assembly 130 to the oil side of the hydraulic accumulator H and, from the other side of the accumulator, an air line 194 passes to valve V2 which either exhausts air from the air side of the accumulator H or supplies air under pressure to it. The hose 48, on the other hand, passes the full length of the positioning arm tube 32 and is connected to the other outlet of the valve V2 for alternate supply and exhausting of air to or from the flexible joint. Both valves V1 and V2 are supplied with compressed air via the branched supply hose 192, valve V1 simply controlling the supply of air to the vibrator valve assembly 170 through pipeline 52. Thus, the branch of hose 192 and hose 52 which pass to valve V1 may be grouped and referenced as hoses 196 as indicated in FIGURE 1 while the group of three hoses, 48, 192 (branch) and 194 which pass to valve V2 can be referenced, 198, as indicated also in FIGURE 1.

The operation of the tree shaking mechanism illustrated in FIGURES 1 to 6 will now be described with specific reference to FIGURES 7 and 8 of the accompanying drawings. Once the catch frame 20 has been placed in position beneath the tree and the air supply S, usually carried by the prime mover, has been brought up to pressure, the tree shaking mechanism is ready for operation. It will be noted that the air supply, through line 192, is connected by valve V2 and hose 48 to the flexible joint 13, the pilot valve assembly 130, and the forward end of the clamping cylinder 84. The connection of the air pressure therefore has the immediate effect of stiffening the flexible joint 13 (since V2 is biased in its normal position) and of retracting the clamping piston 96 and movable jaw 114 since the pilot piston 142 is raised within its bore 140 by the air pressure supplied to the flexible joint 13. The operator M may therefore manipulate the positioning arm in the manner previously described to locate the shaker head so that a branch B to be shaken is disposed between the fixed and movable jaws of the head; such a position is illustrated in FIGURE 7. Then, by the operation of the hand-lever L2, piston P2 in valve V2 may be moved against its bias spring S2 so that air is exhausted from the flexible joint 13 and from the forward end of clamping cylinder 84 but is supplied along hose 194 to the air side of the hydraulic accumulator H to force hydraulic liquid therefrom through pipeline 50 through the pilot valve assembly 130 (now in its normal position) to the rear of the clamping cylinder 84. The operation of valve V2 therefore has three results: it reduces the stiffness of the flexible joint 13 so that the head 14 is no longer positively located at the end of the positioning arm 12; it allows the pilot valve piston 142 to return to its normal position so that the passage 150 is incorporated in the liquid flow path; and the hydraulic liquid is forced from the accumulator into the clamping cylinder 84 behind the piston 96 to move the movable jaw 114 toward the fixed jaw portion 76 so that the branch B is clamped firmly therebetween. This situation is illustrated in FIGURE 8 and, as also shown by FIGURE 1, the shaker head aligns itself perpendicularly to the branch B as its jaws close on the branch the alignment being accommodated by the flexible joint 13 and occurring independently of the positioning arm.

Finally, in the operation of the mechanism, the operator M actuates the hand lever L1 to bring piston P1 of valve V1 into its actuated position while retaining valve V2 actuated. The air supply 192 is therefore connected with the vibrator air supply line 52 so that the vibrator piston 92 is set in motion within the cylinder 82. It will be noted that while shaking is proceeding, the pilot valve piston 142 remains in its normal position and the hydraulic liquid is continually under pressure but movement of the clamping piston 96 within the clamping cylinder 84 during the shaking operation is substantially prevented, because the hydraulic liquid cannot flow from the cylinder 84 back to the accumulator H during the forward stroke of the shaker head 14. After shaking has been completed, the valve V1 is first allowed to return to its normal position so that the vibration of the vibrator piston 92 is stopped, and then the valve V2 is returned to its normal position to stiffen the flexible joint 13 and force the hydraulic liquid to return from the clamping cylinder 84 through the pilot valve piston 142 (now in its normal position) to the hydraulic accumulator H by pressuring the forward end of the clamping cylinder 84. When the jaws are fully open, the head may again be manipulated by the positioning arm.

Thus, it is clear from the above that the head 14 is permitted to align itself perpendicular with a branch independently of the positioning arm and, since the shaking forces are in line with the head, they will be perpendicular to the branch also. Furthermore, because the joint 13 is flexible during shaking movement little or none of the shaking forces will be transferred to the positioning arm 12.

FIGURES 9 and 10 of the accompanying drawings illustrate a modified form of the invention in which the inflatable joint 13 of the embodiment of FIGURES 1 to 8 has been replaced by a mechanical joint. Since the shaker head itself is substantially identical with that described with respect to FIGURES 1-8, it will not be described in detail and its parts will be referred to by the same reference numerals employed in FIGURES 1-8, the suffix "a" being added to each number.

The slightly modified shaker head 14a of this embodiment is illustrated in FIGURE 9 and the rear part has been shown broken away in order to illustrate the manner in which the pilot valve assembly 130a is accommodated. Instead of carrying the attachment ring 77a and the web 116a of the jaw portion 76a rearwardly along a substantial length of the body 74a, the rear end of the ring 77a terminates relatively near the forward end 79a of body 74a and forms a radial abutment face 200. A similar abutment face 202 is formed by the front of a cylindrical enlargement or flange 204 formed at the rear end of the body 74a. The central portion of the body 74a which lies between the flanges 200 and 204 is, in external shape, rectangular (as more clearly illustrated in FIGURE 10); internally, however, the clamping cylinder (not shown) and the vibrator cylinder 82a are substantially identical with those previously described. Pilot valve assembly 130a is substantially identical with that previously described and controls the flow of hydraulic liquid through passage 128a to passage 134a. Since an inflatable joint is not employed, the air hose 48a corresponding to previously described hose 48 is connected by an extension hose 205 and screwed connector 206 directly to passage 138a within the head 14a. In a similar manner, the hose extension 68a is coupled by connector 72a to plug 180a of vibrator valve assembly 170a. Although only one (174a shown dotted in FIGURE 9) of the passages from vibrator valve assembly 170a to the vibrator cylinder 82a is illustrated, two passages are arranged as previously described with respect to the shaker head illustrated in FIGURES 1-8 since valve assembly 170a is substantially identical with that previously described.

In order to permit the shaker head 14a to align itself with a branch Ba (shown in phantom lines in FIGURE 10), and to allow the shaker head 14a to vibrate independently of positioning arm 12a, the rectangular portion of the shaker head body 74a is slidably housed within a correspondingly shaped sleeve 210 assembled thereabout and the sleeve, in turn, is pivotally connected between the arms of a bifurcated yoke 212. Yoke 212 takes the place of the ferrule 34 previously described, but apart from the arms 214 and 216 formed integrally therewith, it may be substantially identical with the previously described ferrule. The sleeve 210 consists of a U-section member 218 which fits about the top 211, bottom 213 and one side (not shown) of the rectangular body 74a, member 218 being retained in position by a second plate member 220 secured across the open ends thereof by Allen screws 222 and lying adjacent side 215 of body 74a. To permit free exhaustion of air from the vibrator cylinder 82a, a central, longitudinally extending slot 224 is cut in the plate 220 to expose exhaust port 170a formed in the corresponding side of the shaker head body 74a. The fork members 214 and 216 are pivotally secured to the sleeve 210 by two trunnion pins 226 and 228, respectively, and their corresponding nuts 230 and 232; the pins 226 and 228 being arranged on a common axis which passes perpendicularly through the top 211 and bottom 213 of the shaker head body 74a. The pins and their nuts are shown in detail in FIGURE 9. Extending from one side of the upper portion of sleeve 210 is a lug 234 to which a stiff inner wire 235 of a Bowden cable 236 is attached, the cable being secured by clip 238 to the arm 214 of fork 212 and also being secured by a strap 240 to the positioning arm 12a. The Bowden cable passes down the positioning arm 12a and terminates in a conventional hand lever (not shown) so that, by moving the central wire 235 thereof, the shaker head 14a may be swung around the common axis of the trunnion pins 226 and 228, the movement being accommodated by the flexibility of the extension hoses 62a, 68a, and 205.

The operation of the modified form of the invention illustrated in FIGURES 9 and 10 is substantially identical with that illustrated in FIGURES 1–8 since the same hand lever controls will be required to operate the clamping cylinder and the vibrator, the valves and hydraulic accumulator being provided as before described. Therefore, as before, neither of the valve hand levers are actuated until the shaker head 14a is positioned on the branch Ba, the latter being achieved, if necessary, with the aid of the Bowden cable 236 in addition to the manipulations of the positioning arm aforedescribed.

The control valves are then operated in sequence as previously to first effect the clamping of the branch between movable jaw 114a and the fixed jaw portion 76a and then to operate the vibrator to shake the branch. Again, it will be noted that the shaker head 14a is free to align itself perpendicularly to the branch Ba without requiring the positioning arm 12a to be similarly aligned. Furthermore, shaking movements of the shaker head 14a are not transferred down the positioning arm 12a because the shaker head 14a is free to slide within the sleeve 210. Normally, the positioning arm 12a will be manipulated so that, just prior to initiation of vibration, the sleeve is centrally positioned between the flanges 200 and 204. However, if this is not done, damage to the mechanism is not likely to occur because of the buffering function of rubber buffer rings 241 and 242 placed around the rectangular portion of the shaker body 74a adjacent the inner faces of the rear and forward flanges 200 and 204 respectively.

While particular embodiments of the present invention have been shown and described it will be understood that the details herein set forth are capable of modification and variation without departing from the principles of the invention and that the scope of the invention should be limited only by the scope and proper interpretation of the claims appended hereto.

The invention having thus been described, that which is believed to be new, and for which protection by Letters Patent is desired, is:

1. A tree shaking device for use in the harvesting of tree born fruit comprising: a rigid positioning arm; a shaker head mounted by and extending from one end of said arm for movement thereby into engagement with a tree limb; limb shaking means mounted within said head operable to generate linear shaking forces in a predetermined direction; a first and a second limb gripping jaw mounted by said head, said first jaw being moveable in said direction to grip a limb between itself and the second jaw, and said jaws being arranged so that, when a limb is gripped thereby, the shaker head is aligned with respect to said limb so that said direction is substantially perpendicular to the limb; a joint of variable stiffness arranged between and effecting the coupling of said one end of said arm and the shaker head; and means for controlling the stiffness of said joint whereby said joint may be rendered sufficiently stiff to enable the shaker head to be positioned by said arm to engage a free limb and whereby, when the limb has been gripped by said jaws, said joint may be rendered sufficiently flexible to allow the head to be aligned perpendicularly with respect to the limb without also aligning the positioning arm perpendicularly to said limb, and whereby said joint may be rendered sufficiently flexible to allow the head to shake the limb without substantially shaking the positioning arm.

2. A tree shaking device for use in harvesting of tree born fruit comprising: a rigid positioning arm; a shaker head mounted by and extending from one end of said arm for movement thereby into engagement with a tree limb; limb shaking means mounted within said head operable to generate linear shaking forces in a predetermined direction; a first and a second limb gripping jaw mounted by said head, said first jaw being movable in said direction to grip a limb between itself and the second jaw, and said jaws being arranged so that, when a limb is gripped thereby, the shaker head is aligned with respect to said limb so that said direction is substantially perpendicular to the limb; a joint of variable stiffness arranged between and effecting the coupling of said one end of said arm and the shaker head; the joint comprising an inflatable tube of flexible material sealed at one to the shaker head and to the other end to the positioning arm; and fluid pressure supply and control means for supplying fluid under pressure to inflate said tube and to render the joint sufficiently rigid to enable the positioning of the shaker head by the positioning arm and for exhausting of fluid from said tube to render the joint sufficiently flexible to permit the shaking of a limb without substantial transference of shaking forces to the positioning arm and to allow the head to be aligned perpendicularly with respect to the limb without also aligning the positioning arm perpendicularly with respect to said limb.

3. A tree shaking device for use in the harvesting of tree born fruit comprising: a rigid positioning arm; a shaker head mounted by and extending from one end of said arm for movement thereby into engagement with a tree branch, branch shaking means within said head operable to generate a linear shaking force along a predetermined path; a clamping cylinder within said head having its axis arranged in said path; a clamping piston within said cylinder; a piston rod connected to said piston and extending from one end of the cylinder; a moveable clamping jaw mounted on the free end of the piston rod for movement therewith in said path to grip a tree limb, said jaw being arranged so that when a branch is engaged and gripped thereby, the shaker head is aligned with respect to the branch so that said path is perpendicular to the branch; a variable flexibility joint arranged between and effecting the coupling of said one end of said arm and the shaker head, said joint comprising an inflatable tube of flexible material sealed at one end to the shaker head and at the other end to the positioning arm; a controlled fluid pressure supply means for supplying air under pressure to simultaneously inflate said tube and to apply pressure to the face of the clamping piston adjacent the moveable jaw to stiffen said joint and retract the moveable jaw, said supply means also being controllable to supply liquid under pressure to the face of the clamping piston remote from the removeable jaw so that the moveable jaw is moved in said path to grip a branch under the action of said liquid pressure; and a pilot operated check valve arranged in the liquid line to the clamping cylinder and normally preventing release of liquid from the clamping cylinder unless and until said air pressure is applied to the joint and the first mentioned clamping piston face; the inflation of said tube rendering the joint sufficiently stiff to enable the accurate positioning of the shaker head and the exhausting of air pressure from said tube rendering the joint sufficiently flexible to permit the shaking of a limb without substantial transference of the shaking forces to the positioning arm and to permit the positioning arm to be aligned with said head during the shaking of the branch.

4. In a tree shaking mechanism, an elongated boom including a mounting end portion, a shaking end portion and means interconnecting said end portions for enabling relative movement of said end portions into and out of axially aligned relation to each other, said shaking end portion including means for clamping a portion of a tree to be shaken and means for shaking said clamping means; means supporting said mounting end portion so that said clamping means of said shaking end portion may be moved into tree clamping position; and means coacting with said interconnecting means for moving the end portions into and out of said axial alignment.

5. In the shaking mechanism of claim 4 wherein said interconnecting means also allows axial movement of the shaking end portion independently of movement of said mounting end portion.

6. The mechanism of claim 4 wherein said supporting means supports said mounting end portion for universal movement.

7. The mechanism of claim 4 including flexible control members connected to said clamping, shaking, and interconnecting means and extending lengthwise of said mounting end portion, and means at the opposite end of said mounting end portion from said shaking end portion for operating said clamping, shaking and interconnecting means through said control members.

8. In a tree shaking mechanism, an elongated boom including a mounting end portion, a shaking end portion, and means interconnecting said end portions for enabling variation of the angle between the longitudinal axes of said end portions, said shaking end portion including means for clamping a portion of a tree to be shaken and means for shaking said clamping means; means attached to and supporting said mounting end portion for movement of said boom so that said clamping means of said shaking end portion may be moved into tree clamping position; and means coacting with said interconnecting means for adjusting said angle between said end portions.

9. The shaking mechanism of claim 8 wherein said clamping and shaking means are fluid-operated and wherein flexible conduits are connected to said clamping and shaking means and extend between said mounting and shaking end portions.

10. In a tree shaking mechanism, an elongated boom including a mounting end portion, a shaking end portion, and means interconnecting said end portions for enabling variation of the angle between the longitudinal axes of said end portions, said shaking end portion including means for clamping a portion of a tree to be shaken and means for shaking said clamping means; supporting means; said mounting end portion being attached to said supporting means, said supporting means movably supporting said boom for movement of said clamping means into tree clamping position, and means associated with said interconnecting means for releasably resisting said angular variation between the end portions.

11. In a tree shaking mechanism, an elongated transversely rigid arm; an elongated transversely rigid shaker head; transversely flexible joint means interconnecting said arm and head so that said head is movable between an attaching position substantially in alignment with the arm and self-adjusted operating positions out of said alignment; and means connected to said joint means for operating the same to move the head into its attaching position and for allowing the head to adjust itself into its operating positions, said head including means for clamping onto a portion of a tree whereby said head adjusts itself relative to the arm so that the longitudinal dimension of the head is substantially perpendicular to said clamped portion irrespetcive of the angular relation of the arm to the clamped portion, and said head also including means for applying shaking forces to said clamping means and clamped portion so that said forces are directed along the longitudinal dimension of said head.

12. In the shaking mechanism of claim 11 wherein said arm and head have adjacent ends, wherein said joint means is a flexible hose interconnecting said adjacent ends, and wherein said operating means is capable of pressurizing said hose to rigidify the same in order to achieve said attaching position and of releasing pressure from said hose in order to achieve said operating positions.

13. The mechanism of claim 11 wherein said joint means includes a yoke rigid with and projecting lengthwise from said arm and a rigid sleeve pivoted in the yoke for movement above an axis transverse to the lengthwise dimension of said arm, wherein said head is slidably received in said sleeve, and wherein said operating means includes a linkage attached to said sleeve for pivoting the same about said transverse axis.

14. The mechanism of claim 13 wherein said linkage is a Bowden cable attached to and extending lengthwise of said arm.

15. The mechanism of claim 11 wherein said clamping means includes a pair of jaws spaced lengthwise of each other with respect to the lengthwise dimension of said head, and wherein one of said jaws is movable relative to the other jaws between open and closed positions of said clamping means.

16. The mechanism of claim 11 wherein said shaking means includes a piston movable lengthwise of and within said head.

17. The mechanism of claim 11 wherein said head includes means for holding said clamping means open as long as said operating means and joint means hold said head in its attaching position.

18. The mechanism of claim 17 including means associated with said operating means for simultaneously closing said clamping means and allowing said head to move into an operating position.

19. In a tree shaking mechanism according to claim 11 wherein said joint means comprises a sleeve within which said head is slidably mounted for movement along said longitudinal dimension without rotation, and a pivotal mounting means connected to one end of said arm and mounting said sleeve for pivotal movement of said head and said sleeve with respect to said arm about an axis substantially perpendicular to said elongated arm.

20. In a tree limb shaking mechanism according to claim 19 wherein said clamping means includes a cylinder formed in said head, a movable piston disposed within said cylinder, a piston rod connected at one end thereof to said piston and extending outward from one end of said cylinder, the other end of said rod being connected to said one movable jaw, said jaws being arranged so that when said movable jaw is moved to grip a limb said shaker head is aligned with its longitudinal dimension substantially perpendicular to said limb.

References Cited by the Examiner

UNITED STATES PATENTS

| | | | |
|---|---|---|---|
| 1,626,068 | 4/1927 | Bartlett | 56—328 |
| 2,692,470 | 10/1954 | Boman | 56—328 |
| 2,700,268 | 1/1955 | Lowe | 56—328 |
| 3,006,130 | 10/1961 | Jones | 56—328 |
| 3,059,402 | 10/1962 | Shipley | 56—328 |

ABRAHAM G. STONE, *Primary Examiner.*

RUSSELL R. KINSEY, *Examiner.*